United States Patent [19]
Morkel et al.

[11] Patent Number: 5,576,883
[45] Date of Patent: Nov. 19, 1996

[54] SPECTRAL POLARISATION SEPARATOR

[75] Inventors: Paul R. Morkel, London; Stephen R. Desbruslais, Sidcup; Nigel H. Taylor, London, all of United Kingdom

[73] Assignee: Northern Telecom Limited, Montreal, Canada

[21] Appl. No.: 372,150

[22] Filed: Jan. 13, 1995

[30] Foreign Application Priority Data

Feb. 26, 1994 [GB] United Kingdom .................. 9403740

[51] Int. Cl.$^6$ ..................................................... G02B 5/30
[52] U.S. Cl. ................................. 359/494; 359/499
[58] Field of Search ........................ 359/494, 497–499, 359/276, 180, 181

[56] References Cited

U.S. PATENT DOCUMENTS

| | | | |
|---|---|---|---|
| 4,495,411 | 7/1985 | Rashleigh | 250/227 |
| 4,744,075 | 5/1988 | Buhrer | 370/3 |
| 4,745,591 | 5/1988 | Foley | 370/3 |
| 5,107,358 | 4/1992 | Hodgkiason et al. | 359/124 |
| 5,142,411 | 8/1992 | Fiala | 359/494 |
| 5,315,431 | 5/1994 | Masuda et al. | 359/281 |
| 5,327,511 | 6/1994 | Heismann et al. | 385/1 |
| 5,351,124 | 9/1994 | Laskoskie et al. | 365/351 |
| 5,355,381 | 10/1994 | Leilabady | 372/28 |
| 5,418,881 | 5/1995 | Hart, Jr. et al. | 385/123 |
| 5,473,457 | 12/1995 | Ono | 359/161 |

FOREIGN PATENT DOCUMENTS

WO93/05554  3/1993  WIPO .

OTHER PUBLICATIONS

Gisin, "Polarization mode dispersion: time versus frequency domains", Optics Communications, vol. 89, 1992, pp. 316–323.

Bergano, "A Two–Wavelength, Depolarized Transmitter for Improved Transmission Performance in Long–Haul EDFA Systems".

Primary Examiner—Timothy P. Callahan
Assistant Examiner—T. Lam
Attorney, Agent, or Firm—Lee, Mann, Smith, McWilliams, Sweeney & Ohlson

[57] ABSTRACT

A spectral polarization separator (SPS) designed to separate two wavelength-separated signals applied to the SPS with the same state of polarisation (SOP) into signals with orthogonal SOP's comprises two or more birefringent fibre elements optically in series. The differential delays and relative orientations of these elements are chosen so that polarisation separation is effected without introducing any polarisation mode dispersion (PMD). This contrasts with a prior art single birefringent element SPS whose operation necessarily does introduce PMD. A particular application for the SPS is in a dual wavelength transmitter designed for overcoming polarization hole-burning effects in a long-haul optically amplified transmission system.

15 Claims, 3 Drawing Sheets

SPECTRAL POLARISATION SEPARATOR

BACKGROUND OF THE INVENTION

This invention relates to spectral polarisation separators (SPSs). A particular, though not necessarily exclusive, application for such an SPS is in an amplified optical transmission system, where it is employed to overcome a phenomenon to which it has been appreciated that long-haul optically amplified systems are subject, namely "polarisation hole-burning" in erbium-doped optical amplifiers used to overcome fibre transmission loss. Polarisation hole burning results from the preferential saturation of the gain due to a subset of erbium ions which are associated with the polarisation-state of the gain-saturating signal.

The consequence of this phenomenon is that the polarisation-state which is orthogonal to the signal can see greater gain than that of the signal polarisation state. Amplified spontaneous emission noise (ASE) in the orthogonal state can thus build up along the system more rapidly than ASE in the signal polarisation state. In addition to causing undesirable additional noise, the orthogonal ASE can build up to an extent whereby the signal power drops in order to conserve the total energy that propagates along the system. As the signal power drops, so the SNR of the system suffers, thereby causing increased errors in the received data stream. It is therefore attractive to reduce the effects of polarisation hole-burning in amplified systems in order to maintain a system with good signal-to-noise characteristics.

A paper by T S Bergano et al. entitled, "A two wavelength depolarised transmitter for improved transmission performance in long-haul EDFA systems", Proc. 1993 IEEE LEOS Meeting, San Jose, November 1993, discloses a method of overcoming polarisation hole burning and non-linear effects in a long-haul communication system by means of the use of a two wavelength transmitter. In this construction, two laser sources, separated by approximately 0.3 nm, are combined with a fibre coupler before being launched, in the same polarisation state, through a conventional optical modulator. Transmission of the light from the two sources through this modulator, with the same polarisation state rather than with orthogonally related polarisation states, overcomes the polarisation sensitivity of a typical modulator, such as a device based on lithium-niobate. Then an SPS (spectral polarisation separator) is required to convert the co-polarised signals at the two wavelengths into substantially orthogonally polarised signals, such substantial orthogonal polarisation being a requirement for transmission down the amplified line in order to overcome the polarisation hole-burning effect in that line. A major improvement of 4.5 dB in the Q value of the system was demonstrated, which directly translates to an improvement in the bit-error-rate of the system.

However, the particular type of SPS described in that paper is far from ideal for use in a practical transmission system since it comprised a single piece of high birefringence fibre located downstream of the modulator, where its presence would have the effect of adding polarisation mode-dispersion (PMD) to the data (in the particular quoted example it would have added 13.5 ps). In combination with the PMD of a typical long-haul cable, this will have the effect of inducing inter symbol interference (ISI) which causes a decrease in the Q, or an increase in the error-rate of the system.

SUMMARY OF THE INVENTION

The present invention is directed to a form of SPS which can be employed to function without introducing substantially any polarisation mode-dispersion.

According to the present invention, there is provided a spectral polarisation separator (SPS) comprising, optically in series, a plurality of birefringent elements having differential delays and principal axes, the relative magnitudes and orientations respectively of which are selected to provide the SPS with the first property that, for a light of a first wavelength, and for light of a second wavelength different from the first wavelength there is co-alignment of the two orthogonally related polarisation states of light launched into one end of the SPS that will propagate through to the other end with a single transit time, and to provide the SPS with the second property that, for light of said first and second wavelengths launched into said one end of the SPS with a particular one of said orthogonally related polarisation states, the light of the first wavelength that emerges from said other end emerges with a state of polarisation that is orthogonally related to the state of polarisation with which the light of the second wavelength emerges.

BRIEF DESCRIPTION OF THE DRAWINGS

There follows a description of an optical transmitter which incorporates a spectral polarisation separator (SPS) embodying the invention in a preferred form. The description of the transmitter is prefaced by analysis of how an SPS works, how some designs of SPS inevitably introduce polarisation mode-dispersion (PMD), and in what circumstances it can be arranged for a design of SPS to be arrived at that will introduce substantially no PMD. The description refers to the accompanying drawings, in which.

DETAILED DESCRIPTION OF PREFERRED EMBODIMENT

Figure 1:
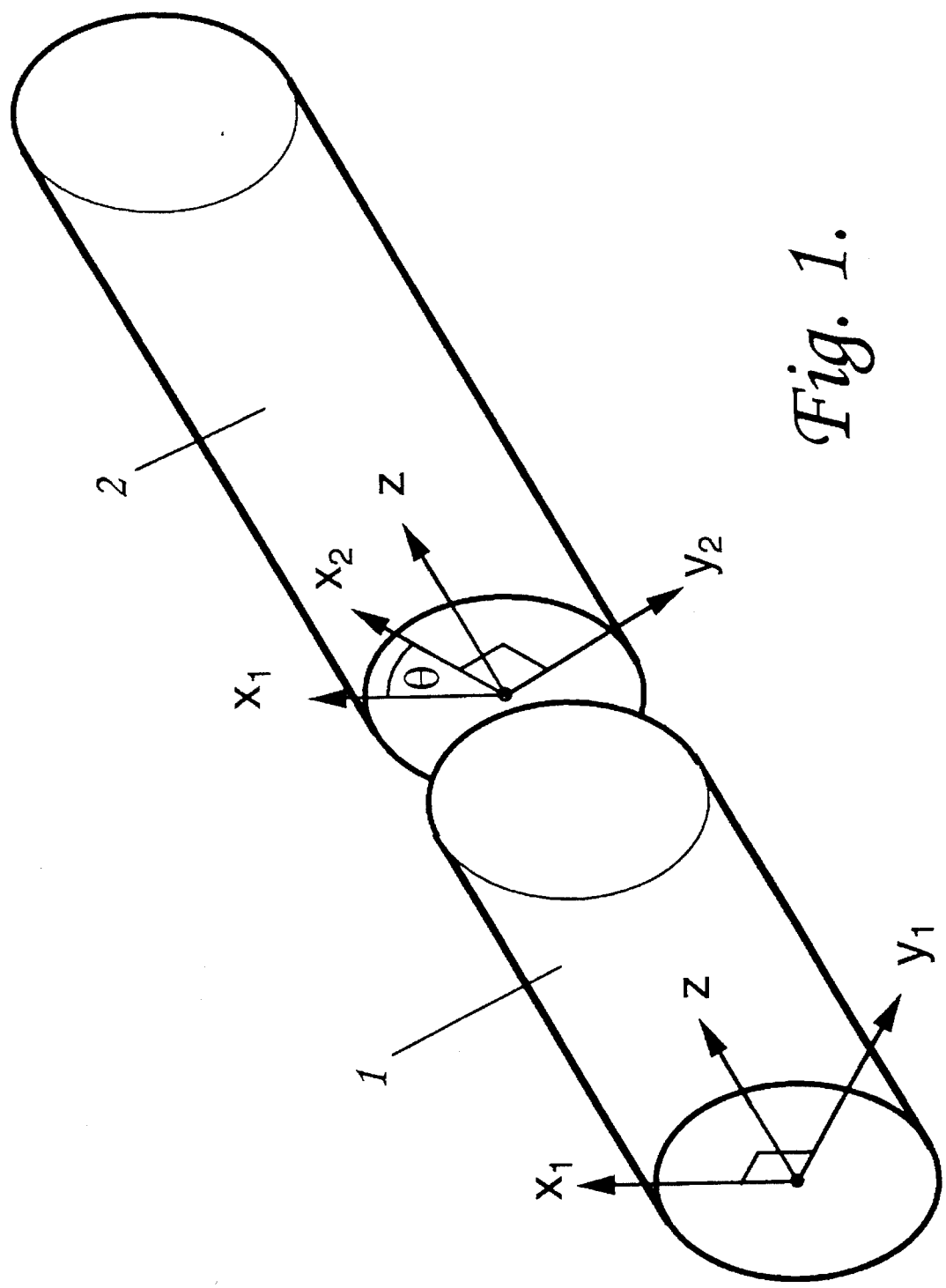
FIG. 1 is a schematic diagram illustrating the concatenation of two lengths of birefringent optical fibre with non-aligned principal polarisation states (axes)

When polarised light propagates through a uniform length of birefringent optical fibre, there are two particular orthogonal polarisation states in which light can be launched into that fibre for which light propagates at a single velocity to emerge from the far end with the same polarisation state as that with which it entered at the front end. For one of these two particular polarisation states the single velocity is faster than that for the orthogonal polarisation state. For polarised light launched into the fibre with any other state of polarisation, the light is resolved into two components propagating with different velocities, respectively the fast and the slow velocities of the two particular polarisation states, giving rise to different transit times in the fibre, and to a phase relationship between the two components at the far end which is, in general, different from that at the front end. Alternatively stated, the light emerging from the far end, in general has a polarisation state which is different from that with which the light was launched into the front end.

It is this phenomenon that is utilised in the single birefringent fibre element SPS of the Bergano et al. paper to which previous reference has been made. In the case of the single element SPS, the light is launched into the element with a polarisation state that is resolved into substantially equal amplitude fast and slow propagating components. In the passage of the light through the element, the phase difference, $\delta_{(\lambda_{1,2})}$ between the two components of either wavelength $\lambda_1, \lambda_2$ changes according to the formula refractive indices at the two wavelengths $\lambda_1$ and $\lambda_2$, and l is the length of the element. The condition for the element converting copolarisation into orthogonal polarisation is that the difference in phase difference, $(\delta_{\lambda_1 - \delta\lambda_2})$, is $(2N+1)\pi$ where N is an integer. Polarisation mode dispersion (PMD) is an inevitable consequence of this design of spectral polarisation separator (SPS) because an SPS must produce a change in polarisation state whereas, in the case of a single uniformly birefringent element, such a change occurs only if the incident polarised light is divided into components that propagate through the element with different transit times.

In respect of a single uniformly birefringent fibre element, each of the two orthogonally polarised states in which light can be launched into the element to propagate through it with a single transit time, these two polarisation states being termed eigenstates, is also the polarisation state with which that light emerges from the element. However, in respect of more complex structures comprising two or more uniformly birefringent fibre elements optically in series, this last relationship does not necessarily hold. In these circumstances there is still, for any given wavelength, a pair of orthogonal polarisation states having the property that light, launched into one end of the complex structure with either one of these polarisation states, will propagate through the structure with a single transit time, but the polarisation state with which that light emerges from the far end of the complex structure is not in general the same polarisation state as that with which the light was launched into the element. For that given wavelength, each of the two orthogonal polarisation states with which light launched into one end of the complex structure to propagate through it with a single transit time will be referred to as a 'launch eigenstate' for that structure for that wavelength, and the corresponding polarisation state with which that light emerges from the far end of the complex structure will be referred to as an 'emergence eigenstate'. Thus the two orthogonal launch eigenstates for a given wavelength in respect of a given complex structure for light launched into one end of that structure are the two emergence eigenstates for that wavelength in respect of light launched into the other end. For more particulars concerning the propagation of light through such a set of elements reference may be made to a paper by N Gisin & J P Pellaux entitled, 'Polarisation mode dispersion: time versus frequency domains', Optics Communications, Vol. 89, pp 316–323 (1 May 1992).

In respect of a single uniformly birefringent element, the launch and emergence eigenstates are identical polarisation states and are independent of wavelength. In respect of the complex structure comprising two or more uniformly birefringent fibre elements optically in series, the launch and emergence eigenstates are in general not the same. Moreover, they are wavelength dependent, and the difference between a launch eigenstate and its corresponding emergence eigenstate is also functionally dependent upon wavelength. It may be conjectured that it might be possible that those two aspects of wavelength dependence of launch and emergence eigenstates in a complex structure could be employed to devise a structure having the property that a particular polarisation state is a launch eigenstate for each of two particular wavelengths, and also that the corresponding emergence eigenstates are orthogonally related. A complex structure having these properties would function as a spectral polarisation separator (SPS) for light of these two wavelengths launched into the structure with the polarisation state of that launch eigenstate, converting that light from co-polarisation to orthogonal polarisation, and because the light of each wavelength is launched into the element in a launch eigenstate, it propagates with a single transit time, and therefore the conversion does not introduce any polarisation mode dispersion (PMD).

The orientation of the eigenstates of a general birefringent element are given by the eigenvectors of the matrix product given by:

$$M = T' \cdot T^{-1}$$

where T is the transmission Jones matrix of the birefringent structure, T' is the differential, with respect to angular frequency, of the Jones matrix T, and $T^{-1}$ is the reciprocal (inverse) of the Jones matrix. T FIG. 1 depicts a two-element complex structure comprising two uniformly birefringent fibre elements 1 and 2 having principal axes $x_{1,2}$ and $y_{1,2}$ perpendicular to the fibre axis z, and for which $x_2$ is inclined at an angle $\theta$ to $x_1$, where $\theta$ is neither zero nor an integral multiple of $\pi/2$. The two fibres 1 and 2 of FIG. 1 may be connected optically in series by any convenient means, such as a fibre connector, or preferably by a fusion splice. The differential delays and differential phase delays of these two fibres 1 and 2 are $\tau_{1,2}$ and $\delta_{1,2}$ respectively, where $\delta_{1,2} = \pi \nu \tau_{1,2}$ and $\nu$ is the optical frequency. Although FIG. 1 depicts the two birefringent elements 1 and 2 as being lengths of birefringent fibre, it should be understood that their place can be taken by birefringent bulk optic elements.

For the complex structure of FIG. 1, the transmission Jones matrix T is given by the matrix product:

$$T(\delta_1, \delta_2, \theta) = \begin{pmatrix} e^{i\frac{\delta_2}{2}} & 0 \\ 0 & e^{-i\frac{\delta_2}{2}} \end{pmatrix} \begin{pmatrix} \cos(\theta) & \sin(\theta) \\ -\sin(\theta) & \cos(\theta) \end{pmatrix} \begin{pmatrix} e^{i\frac{\delta_1}{2}} & 0 \\ 0 & e^{-i\frac{\delta_1}{2}} \end{pmatrix}$$

Using the above equations, it can be shown that, for the structure to have the eigenstate relationship that will convert co-polarisation into orthogonal polarisation without PMD, the following three relationships must be satisfied:

$$\cos(2\theta) = -\tau_2/\tau_1$$

$$\Delta\nu\tau_2 = (2N_2 - 1)/2 \quad N_2 = 1, 2, 3 \ldots$$

$$\Delta\nu\tau_1 = N_1 \quad N_1 = 1, 2, 3 \ldots$$

where $N_2$ and $N_1$ are independent integers and $\Delta\nu$ is the separation frequency between the two wavelengths considered.

Figure 2:
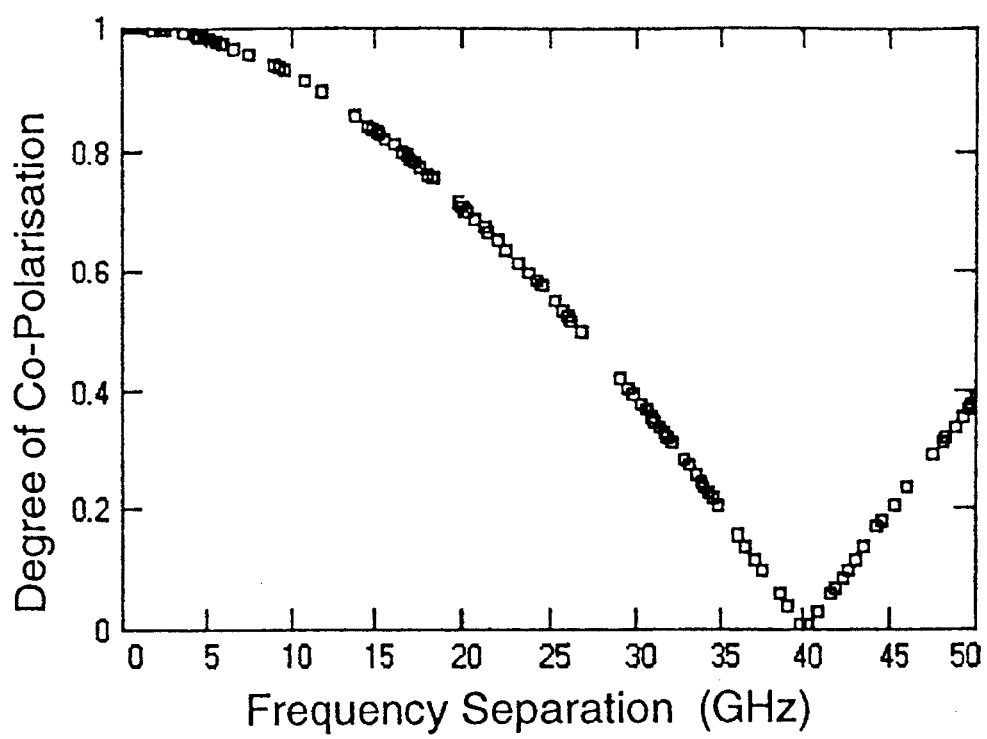
FIGS. 2 and 3 are plots showing, as a function of frequency separation, the degree of co-polarisation respectively of the emergence and launch eigenstates (as hereinafter defined) of a particular example of the concatenation of FIG. 1.
Figure 3:
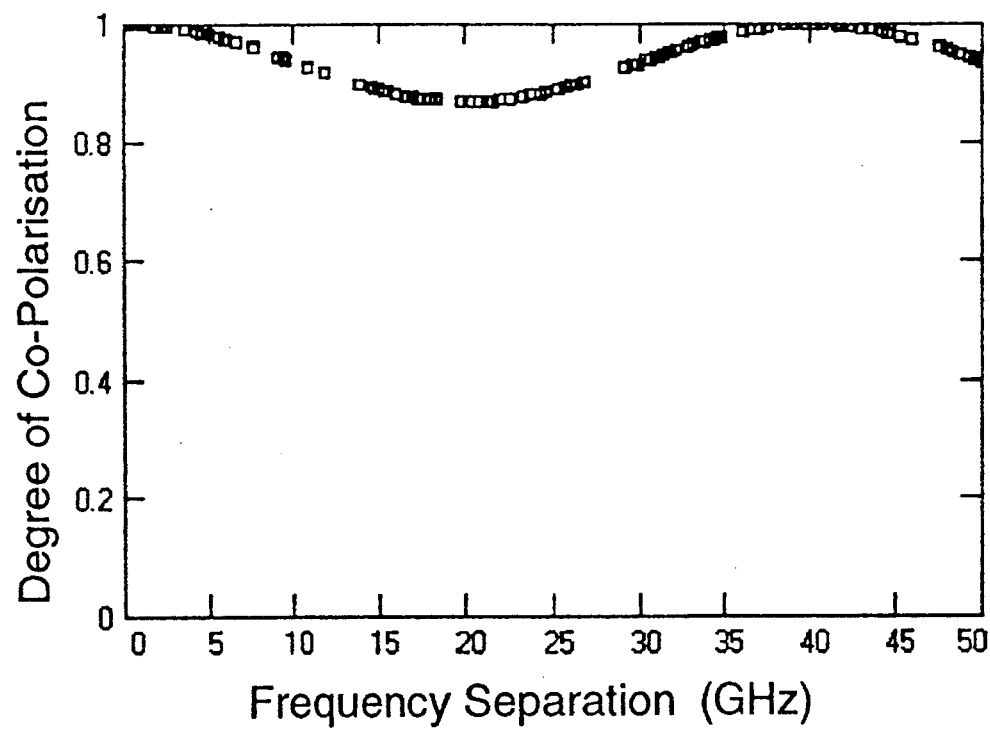

FIG. 2 shows the variation, as a function of frequency separation, of the degree of co-polarisation of the emergence eigenstates in respect of the particular example of two-element complex structure as depicted in FIG. 1 that satisfies the above three relationships, and for which $\tau_1 = 25$ ps, $\tau_2 = 12.5$ ps, and $\theta = \pi/3$. The vertical axis of FIG. 2 represents the degree of co-polarisation of the output axes, and the horizontal axis the frequency difference. The degree of co-polarisation is unity when the eigenstates are identical, and is zero when they are orthogonal. It is seen from this graph that an orthogonality relationship occurs in this instance at a frequency separation of 40 GHz. FIG. 3 is an equivalent graph depicting, in respect of the same complex structure, the corresponding variation in the degree of co-polarisation of the launch eigenstates. This figure shows that the launch eigenstates are co-polarised, as required, for a frequency difference of 40 GHz. We have therefore, in the case of this particular structure of FIG. 1 for which $\tau_1=25$ ps $\tau_2=12.5$ ps, and $\theta=\pi/3$, a structure which shows $\pi/2$ rotation of the polarisation states of the different wavelengths without contributing PMD to either channel.

Figure 4:
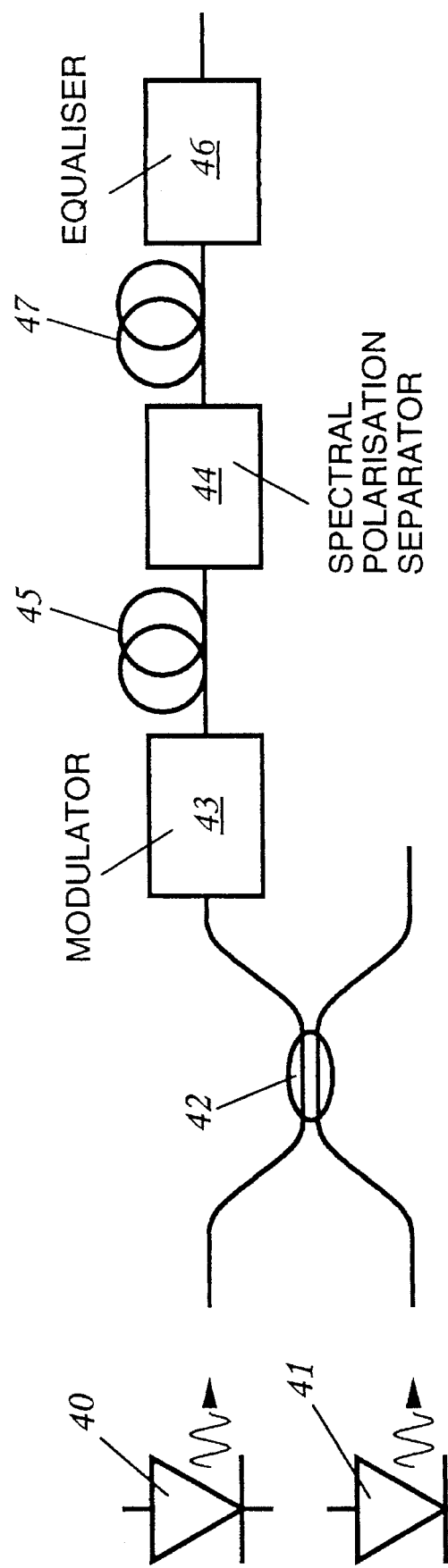
FIG. 4 is a schematic diagram of an optical transmitter incorporating the particular example of the concatenation of FIGS. 1, 2 and 3.

Attention is now turned to the transmitter depicted in FIG. 4, which is a dual wavelength transmitter designed for use in a long-haul optically amplified communication system, and that incorporates an SPS as described above with particular reference to FIGS. 1, 2, and 3. One method of providing the two wavelengths is to employ two unmodulated laser sources 40 and 41 separated in frequency by between 5 GHz and 100 GHz, (e.g. 40 GHz). A polarisation beam splitter 42 is employed to multiplex the outputs of the two lasers for application with the same polarisation state to an optical modulator 43 used to impress amplitude modulation upon the unmodulated carrier signals provided by the two lasers. The polarisation beam splitter may be of the tapered fused fibre type, in which case it may be constructed from polarisation maintaining fibre using the progressive stretching method described in GB 2 150 703 A and GB 2 170 920 A. As an alternative to the use of separate sources 40 and 41, multiple frequencies can be generated from a single laser source in the form of side-bands created in an optical modulator. This can be an additional phase or amplitude modulator, or the same modulator 43 that is used to impart data, but in this instance driven with an additional signal for the purpose of side-band generation. The output of the modulator is fed to an SPS 44 via a polarisation state adjuster 45 schematically depicted in FIG. 4 as a pair of fibre loops. The SPS 44 is the device of FIG. 1, and the function of the polarisation adjuster 45 is to convert the polarisation state of the light emerging from the modulator 43 into a polarisation state matching one of the launch eigenstates of the SPS 44.

Although the SPS 44 contributes no polarisation mode dispersion, the transit times through the SPS for the two launch eigenstates are not identical. In the case of the specific SPS design for which $\tau_1=25$ ps, $\tau_2=12.5$ ps, and $\theta=\pi/3$, this differential delay (transit time difference) between the two wavelength channels amounts to 21.5 ps. This differential delay is cancelled by feeding the output of the SPS through an equaliser 46. This equaliser may comprise a third birefringent (differential delay) element, or alternatively a component showing significant chromatic dispersion can be used. As an example of the latter, a length of dispersive optical fibre which shows a differential group delay equal to 21.5 ps could be used as the equaliser element 46. If a third birefringent element is to be used as the equaliser element 46, the output of the SPS will need to be applied to this third birefringent element with its two orthogonally polarised signals polarised in alignment with the appropriate ones of the two principal axes of that third element, thereby implying the need in this instance for a polarisation state adjuster 47 to be located between the SPS and this third birefringence element in order to transform the polarisation states of the emerging light form the generally arbitrary emergence eigenstates of the SPS into the required polarisation states for launching into the third element.

If two lasers are used to provide the two spectral components, the frequency separation of the two laser should be sufficient to ensure adequate polarisation rotation within one bit period (say at least one complete polarisation evolution). Additionally, small variations in the frequency separation may be expected in practice due to thermal drifts in the transmitter. This implies a frequency separation nominally in excess of 10 GHz. The frequency separation of the lasers should be small enough to ensure that they retain the same relative polarisation state as the signal propagates down a long-haul system subject to cable PMD. In general this would imply a frequency separation less than a nominal 100 GHz. Additionally, spectral gain variation in the optical amplifiers will limit the maximum tolerable frequency difference. It is believed that the likely optimum separation of the two wavelengths, for a two laser transmitter, will be in the range 30–80 GHz.

We claim:

1. A spectral polarisation separator (SPS) comprising, optically in series between first and second ends thereof, a plurality of birefringent elements having differential delays not all of the same magnitude, and principal axes orientations not all of the same orientation, which elements are arranged to have relative differential delays and relative principal axes orientations selected to provide the SPS, for a light of a first wavelength and for light of a second wavelength different from the first wavelength, with a first property, the property that light of either of a two orthogonally related polarisation states launched into said first end of the SPS will propagate through to the other end with a single transit time, and to provide the SPS with the second property, the property that, for light of said first and second wavelengths launched into said first end of the SPS with a particular one of said two orthogonally related polarisation states, said light of said first and second wavelengths emerges from said second end of the SPS with emergent polarisation states that are orthogonally related.

2. A spectral polarisation separator as claimed in claim 1, wherein said plurality of birefringent elements consists of two birefringent elements.

3. A spectral polarisation separator comprising two birefringent elements respectively having differential delays $\tau_1$ and $\tau_2$, which two elements are connected together optically in series with the principal birefringence axes of one element inclined at an angle $\theta$ to those of the other element, wherein $\theta$ is neither zero nor an integral multiple of $\pi/2$, wherein $\cos(2\theta)=-\tau_2/\tau_1$, and the values of $\tau_1$ and $\tau_2$ respectively satisfy the relationships $\Delta v \tau_1 N_1$ and $\Delta v \tau_2=(2\ N_2-1)/2$, where $N_1$ and $N_2$ are positive integers and $\Delta v$ is an optical frequency difference, which optical difference frequency is the difference in optical frequency between light of a first wavelength and light of a second wavelength, said first and second wavelengths being wavelengths that are polarisation separated by the SPS.

4. A dual wavelength transmitter incorporating a spectral polarisation separator as claimed in claim 1.

5. A transmitter as claimed in claim 4, wherein an output of the spectral polarisation separator is fed to an equaliser that provides, for said first and second wavelengths, a differential delay of a value to compensate for the differential delay presented to these two wavelengths by the spectral polarisation separator.

6. A transmitter as claimed in claim 5, wherein said equaliser is constituted by a length of dispersive optical fibre.

7. A transmitter as claimed in claim 5, wherein said equaliser is constituted by a birefringent element.

8. A transmitter as claimed in claim 4, which transmitter includes an amplitude modulator an output of which is optically coupled with an input of the spectral polarisation separator via a polarisation state adjuster.

9. A transmitter as claimed in claim 8, wherein the transmitter includes first and second laser sources, each with an emission matched with a different one of said first and second wavelengths, which sources are optically coupled with an optical input to the modulator by a multiplexer which applies unmodulated signals from said first and second sources to the modulator with matching states of polarisation.

10. A dual wavelength transmitter incorporating a spectral polarisation separator as claimed in claim 3.

11. A transmitter as claimed in claim 10, wherein an output of the spectral polarisation separator is fed to an equaliser that provides, for said first and second wavelengths, a differential delay of a value to compensate for the differential delay presented to light of said first and second wavelengths by the spectral polarisation separator.

12. A transmitter as claimed in claim 11, wherein said equaliser is constituted by a length of dispersive optical fibre.

13. A transmitter as claimed in claim 11, wherein said equaliser is constituted by a birefringent element.

14. A transmitter as claimed in claim 10, which transmitter includes an amplitude modulator an output of which is optically coupled with an input of the spectral polarisation separator via a polarisation state adjuster.

15. A transmitter as claimed in claim 14, wherein the transmitter includes first and second laser sources, each with an emission matched with a different one of said first and second wavelengths, which sources are optically coupled with an optical input to the modulator by a multiplexer which applies unmodulated signals from said first and second sources to the modulator with matching states of polarisation.

* * * * *